Oct. 7, 1941.   H. L. BONE ET AL   2,258,349
DRIVE MECHANISM FOR AXLE DRIVEN SPEED RESPONSIVE
DEVICES FOR RAILWAY TRAINS
Filed Aug. 3, 1940
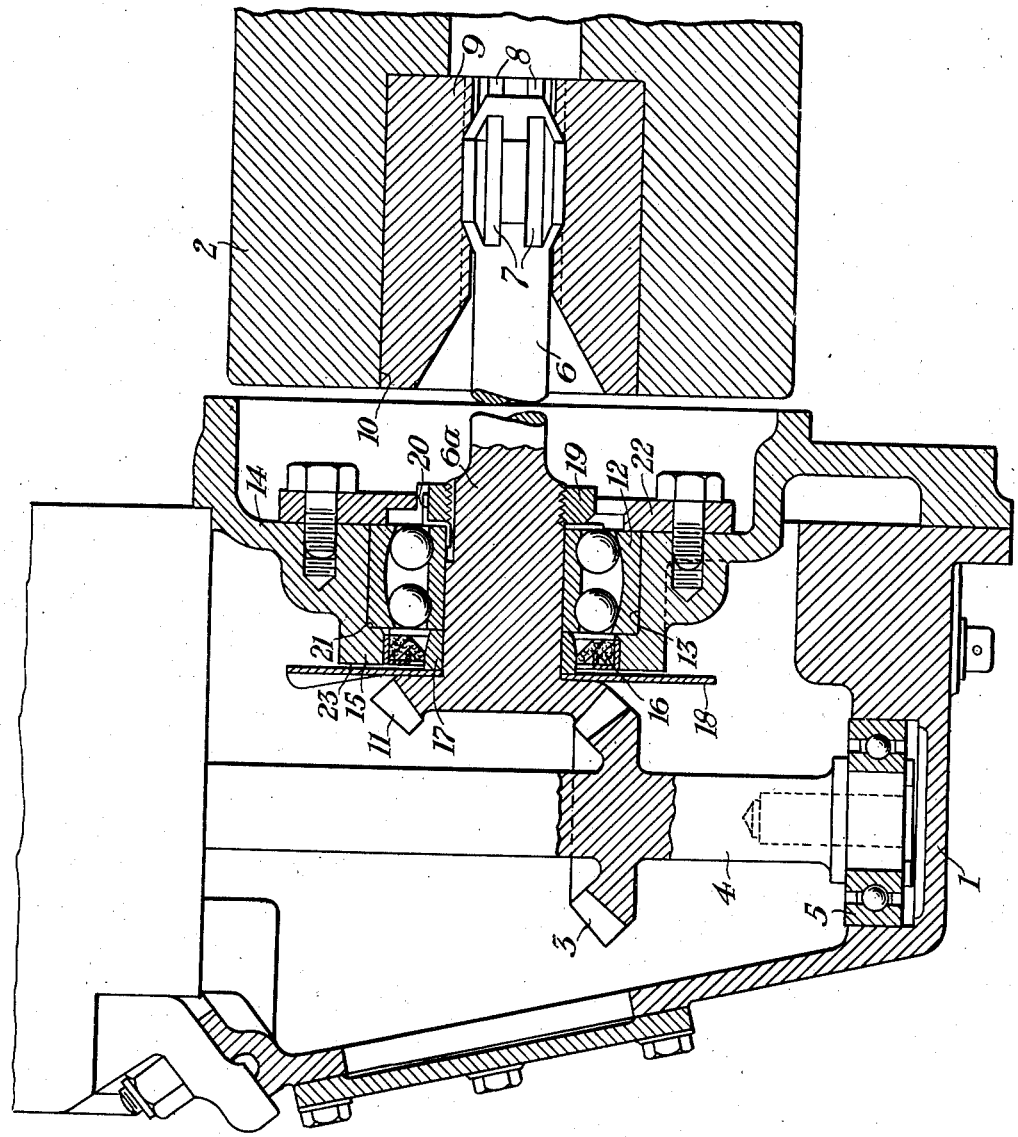
INVENTORS
Herbert L. Bone and
John W. Livingston.
BY
THEIR ATTORNEY Patented Oct. 7, 1941

2,258,349

UNITED STATES PATENT OFFICE 2,258,349

DRIVE MECHANISM FOR AXLE DRIVEN SPEED RESPONSIVE DEVICES FOR RAILWAY TRAINS

Herbert L. Bone and John W. Livingston, Forest Hills, Pa., assignors to The Union Switch & Signal Company, Swissvale, Pa., a corporation of Pennsylvania Application August 3, 1940, Serial No. 350,592

4 Claims. (Cl. 105—96.1)

Our invention relates to drive mechanisms for axle driven speed responsive devices for railway trains.

One object of our invention is to provide a novel and improved drive mechanism which will enable the speed responsive device to be mounted adjacent to, and driven from, the end of an axle of a vehicle of a railway train, the speed of which is to be determined.

Another object of our invention is to provide an effective oil seal to prevent the escape of oil from the casing of a speed responsive device through a self aligning bearing in which a shaft for driving the mechanism of the device is rotatably mounted, and to make use of an oil thrower plate, which is provided primarily for the purpose of lubricating certain parts of the speed responsive mechanism, as a means to prevent the drive shaft, during assembly of the speed responsive device to, or its removal from a vehicle, from assuming an angular position in which it might cause damage to the oil seal.

According to our invention a bevel gear for driving the speed responsive device is driven by another bevel gear formed on one end of a drive shaft, the other end of which drive shaft is operatively connected with an axle of the vehicle by any suitable connecting means which will cause the drive shaft to rotate in response to rotation of the axle, but which will allow a limited amount of angularity between the axle and the drive shaft. The drive shaft is journaled, adjacent the end on which the bevel gear is formed, in a self-aligning spherical ball bearing to permit the necessary tilting of the shaft caused by axle bearing wear or the usual manufacturing tolerances. This bearing is disposed in a bearing opening formed in the case of the device, and is clamped on the drive shaft between the back of the gear and a retainer nut, together with an oil thrower plate for lubricating certain parts of the speed responsive device, and a wear ring which cooperates with an oil seal disposed in the inner end of the bearing opening. The bearing is so placed with respect to the gear teeth of the bevel gear formed on the drive shaft that the normal allowable tilting of the shaft will move the gear teeth in a direction nearly parallel to the axes of the teeth to prevent the teeth of the two gears from binding. The wear ring has a hardened surface to resist the abrasion of the oil seal, and is so designed that it can be replaced when worn. The width of this ring is such that a small gap is maintained between the oil thrower plate and the inner end face of the casting in which the bearing opening is formed, this gap being such that excessive angularity of the shaft which might take place before or during assembly of the speed responsive device to the vehicle will be limited, by engagement of the oil thrower plate with the inner end face of the casting, to a value which will not destroy the oil seal by reason of excessive distortion. Under normal operating conditions this gap remains sufficiently large to prevent contact between the oil thrower plate and the face of the casting in which the opening is formed.

Other objects and characteristic features of our invention will become apparent as the description proceeds.

We shall describe one form of drive mechanism embodying our invention, and shall then point out the novel features thereof in claims.

The accompanying drawing is a longitudinal sectional view showing one form of drive mechanism embodying our invention for connecting a speed responsive device with a vehicle axle.

Referring to the drawing, the reference character 1 designates a housing which is adapted to be secured in any suitable manner to the journal box of a railway vehicle adjacent one end of one of the axles 2 of the vehicle. This housing may contain any type of mechanism which it is desired to operatively connect with the axle 2, such for example, as a speed responsive device of the type described and claimed in Letters Patent of the United States, No. 2,113,645, granted on April 12, 1938, to Herbert L. Bone, and, as here illustrated, this housing contains a bevel gear 3 formed integrally with a vertical shaft 4 journalled in anti-friction bearings 5, only the lower one of which is shown in the drawing. It will be understood that this gear 3 forms a part of the operating mechanism for the speed responsive device, and according to our present invention we provide mechanism which we will now describe for driving this gear from the axle 2.

The drive mechanism in the form here shown comprises a drive shaft 6 provided at one end with splines 7 which are adapted to slide in longitudinal grooves 8 formed in a plug 9 fitted into a hole 10 bored in the center of the axle 2. The plug 9 is constrained to rotate in response to rotation of the axle, and it will be apparent that the splines and grooves provide a driving connection between the axle and the drive shaft. The grooves, however, are made sufficiently longer than the splines to enable the shaft to remain in a fixed longitudinal position irrespective of the usual endwise motion of the axle permitted by the axle bearings, and sufficient clearance is provided between the splines and the grooves to enable the drive shaft to tilt relative to the axle in all directions through an angular distance of sufficient magnitude to take care of any misalignment between the drive shaft and the axle likely to result from the usual manufacturing tolerances or axle bearing wear.

The other end of the drive shaft 5 extends into the housing 1 and has formed on its inner end a bevel bear 11 which meshes with the bevel gear 3, whereby the rotation of the drive shaft is transmitted to the shaft 4 of the speed responsive device. Due to the fact that the drive shaft 6 is permitted to tilt relative to the axle, and the further fact that the speed responsive device is fixed relative to the axle, it is necessary to enable the drive shaft to tilt relative to the speed responsive device, and to this end, the shaft is carried in a self aligning spherical ball bearing 12. This bearing is disposed in a bearing opening 13 provided in a separator plate 14 bolted to, and forming part of the housing of the speed responsive device, and is mounted on an enlarged portion 6a of the drive shaft. An annular inturned flange 15 is formed on the separator plate at the end of the bearing opening 13 nearest to the bevel gear 11, and an oil seal 16 is fitted within this flange and seals against a hard ring 17 which is provided on the drive shaft between the inner end of the bearing and the back of the bevel gear 11. An oil thrower plate 18 for lubricating the intermeshing gears 3 and 11, as well as other parts of the speed responsive device, is also mounted on the enlarged portion 6a of the drive shaft between the rear face of the gear 11 and the hard ring 17, and the whole assembly is clamped between the back of the gear and a retainer nut 19 which is screwed onto the enlarged portion 6a at the outer side of the bearing. The nut 19 is locked in place by means of a lock washer 20. The bearing is positioned in the bearing opening 13 by means of a shoulder 21 formed by the annular flange 15 and a retaining ring 22 bolted to the separator plate 14.

With the parts assembled in this manner, it will be apparent that any tilting of the drive shaft relative to the speed responsive device will occur about a point disposed at the center of the self aligning bearing 12. This bearing is so placed with respect to the teeth of the gear 11 that any vertical misalignment of the shaft resulting from axle bearing wear or the usual manufacturing tolerances will move the teeth of the gear 11 in a direction nearly parallel to the axes of the teeth, whereby tilting of the shaft from its normal position in which its axis aligns with the axis of the axle will have a minimum effect in changing the meshing depth of the gear teeth. Furthermore, the ratio of the distance between the center of the bearing and the gear teeth to the distance between the center of the bearing and the end of the splines is such that only a small motion of the gear teeth will result from the normal vertical motion of the splined end of the drive shaft.

The ring 17 has a surface which is hardened to resist the abrasion of the oil seal, and this ring is so designed that it can be replaced when worn. The width of this ring is held in manufacture to such limits that a small gap is maintained between the oil thrower plate 18 and a finished surface 23 which is provided on the separator plate at the inner end of the flange 15. The oil seal 16 is of a type utilizing a packing material which will maintain an effective seal for a maximum length of time provided it is not distorted too far out of shape due to excessive angularity of the shaft. The only time that excessive angularity of the shaft is likely to occur is while the device is being handled prior to, or during assembly of the speed responsive device to the vehicle, or during its removal from the vehicle, and the gap which is provided between the separator plate and the adjacent surface 23 is limited to such a value that the plate will strike the surface 23 and will prevent further angular movement of the drive shaft relative to the device before the drive shaft can reach an angular position which would damage the oil seal. It will be understood of course that this gap is sufficiently large to prevent the oil thrower plate from striking the surface 23 in response to any tilting of the shaft which might occur under normal conditions.

Although we have herein shown and described only one form of drive mechanism embodying our invention, it is understood that various changes and modifications may be made therein within the scope of the appended claims without departing from the spirit and scope of our invention.

Having thus described our invention, what we claim is:

1. The combination with a vehicle axle, of a first bevel gear rotatably mounted adjacent one end of the vehicle axle in a position fixed with respect to the vehicle, a drive shaft operatively connected at one end with said axle by means which allows said shaft to tilt in all directions from the position in which it aligns axially with the axle and provided at the other end with a second bevel gear which meshes with said first bevel gear, and a self aligning bearing supporting said shaft adjacent said bevel gear, said bearing being so placed with respect to said second gear that tilting of said drive shaft relative to said axle will move the teeth of said second gear in a direction nearly parallel to the axes of the teeth, whereby variations in the meshing depth of the teeth of said gears caused by tilting of the drive shaft relative to the axle is reduced to a minimum.

2. The combination with a vehicle axle, of a first bevel gear rotatably mounted adjacent one end of the vehicle axle in a position fixed with respect to the vehicle, a drive shaft operatively connected at one end with said axle by means which allows said shaft to tilt in all directions from the position in which it aligns axially with the axle and provided at the other end with a second bevel gear which meshes with said first bevel gear, and a self aligning bearing supporting said shaft adjacent said bevel gear, said bearing being so placed with respect to said second gear that tilting of said drive shaft relative to said axle will move the teeth of said second gear in a direction nearly parallel to the axes of the teeth and the ratio of the distance between the center of the bearing and the gear teeth to the distance between the center of the bearing and the point of connection of said drive shaft with said axle being such that only a relatively small motion of the gear teeth will result from all normal tilting motion of the end of the shaft which is connected to said axle, whereby variations in the meshing depth of the teeth of said gears caused by tilting of the drive shaft relative to the axle is reduced to a minimum.

3. The combination with a vehicle axle, of a first bevel gear rotatably mounted adjacent one end of said axle within a housing fixed to the vehicle, a drive shaft operatively connected at one end with said axle by means which permits limited axial misalignment of said drive shaft and said axle and extending at the other end into said housing and provided with a second bevel gear which meshes with said first gear, a bearing opening in said housing through which said drive shaft extends, a self aligning bearing secured within said opening and mounted on said shaft between the rear face of said gear and an abutment fixed with respect to said shaft, an oil thrower plate and a wear ring disposed on said shaft between said bevel gear and said bearing, and an oil seal disposed in the inner end of said bearing opening and sealing against said wear ring, said wear ring being of such length that it maintains a small gap between said oil thrower plate and an annular surface provided on said housing adjacent said plate under normal conditions of axial misalignment between said shaft and said axle but that excessive angularity of the shaft during assembly of the parts to or removal from the vehicle is prevented by engagement of said oil thrower plate with said annular surface.

4. In a drive connection in which a drive shaft is provided at one end with a driving gear and is journalled in a self aligning bearing which is mounted on the shaft adjacent the gear to permit the shaft to tilt in all directions from a normal position while rotating, the combination of a casing provided with an opening in which said bearing is fixed and with an annular machined surface at the inner end of said opening adjacent said gear, an oil thrower plate and a wear ring mounted on said shaft between said gear and said bearing, and an oil seal mounted in said opening and sealing against said wear ring, the parts being so proportioned that said oil thrower plate will be separated from said machined surface during the normally intended tilting of said shaft but that excessive tilting of said shaft sufficient to damage said oil seal will be resisted by engagement of said oil thrower plate with said machined surface.

HERBERT L. BONE.
JOHN W. LIVINGSTON.